United States Patent [19]

Klüting et al.

[11] Patent Number: 4,515,339
[45] Date of Patent: May 7, 1985

[54] HEIGHT ADJUSTMENT ARRANGEMENT FOR SEATS, PARTICULARLY MOTOR VEHICLE SEATS

[75] Inventors: Bernd Klüting, Radevormwald; Bernd Engels, Remscheid, both of Fed. Rep. of Germany

[73] Assignee: Keiper Automobiltechnik GmbH & Co. KG., Remschied, Fed. Rep. of Germany

[21] Appl. No.: 328,097

[22] Filed: Dec. 7, 1981

[30] Foreign Application Priority Data

Dec. 12, 1980 [DE] Fed. Rep. of Germany ....... 3046886

[51] Int. Cl.³ .............................................. F16M 13/00
[52] U.S. Cl. ..................................... 248/543; 248/421
[58] Field of Search ..................... 248/421, 584, 543

[56] References Cited

U.S. PATENT DOCUMENTS

| | | | |
|---|---|---|---|
| 2,784,764 | 3/1957 | Rigby | 248/421 |
| 2,929,439 | 3/1960 | Tanaka | 248/421 |
| 2,982,336 | 5/1961 | Minici | 248/421 |
| 3,149,815 | 9/1964 | Cotter | 248/421 |
| 3,897,036 | 7/1975 | Nyström | 248/421 |

FOREIGN PATENT DOCUMENTS 2539332 3/1976 Fed. Rep. of Germany ...... 248/543

Primary Examiner—William H. Schultz
Assistant Examiner—Robert A. Olson
Attorney, Agent, or Firm—Michael J. Striker

[57] ABSTRACT

A height adjustment arrangement for a motor vehicle seat has a plurality of pivotable supports each having one end portion arranged at a fixed height relative to a vehicle floor and another end portion hingedly connectable with a seat portion, and a plurality of pairs of separate supporting elements arranged so that each pair of the supporting elements is pivotably connected with a respective one of the pivotable supports. A first supporting element of each pair is mounted on the seat portion, whereas a second supporting element of the same pair is mounted at a fixed height relative to the vehicle floor.

6 Claims, 5 Drawing Figures

HEIGHT ADJUSTMENT ARRANGEMENT FOR SEATS, PARTICULARLY MOTOR VEHICLE SEATS

BACKGROUND OF THE INVENTION

The present invention relates to a height adjustment arrangement for seats, particularly motor vehicle seats.

Height adjustment arrangements of the above mentioned general type are known in the art. In a known height adjustment arrangement, a seat part is raisable and lowerable with the aid of pivotable supports arranged in the region of each seat corner. The pivotable supports are moved by a slide device including a thread spindle and an axially immovable nut engaged with the latter, and have one end arranged at a fixed height and another end hingedly connectable with the seat part. Such a height adjustment arrangement is disclosed, for example, in the German Offenlegungsschrift No. 2,846,632 and has adjusting drives surrounding the pivotable supports at four corners of the seat portion and formed as structural units. The adjustment drives are components of a frame which is arranged on a frame of the vehicle floor or on the guiding elements arranged on the vehicle floor. The pivotable supports are mounted rotatably in the housing of the adjustment drive at their one ends and pivotably connected with their free ends on a frame supported on the seat portion. The adjustment drives are assembled in pairs in the region of the seat front side and the back part of the seat and selectively driven by a motor separately from one another. The above described height adjustment arrangement has a complex construction which is relatively expensive both in the sense of the material consumption and the manufacturing and mounting of the same. Moreover, it is necessary to provide for such a height adjustment arrangement a lower frame mounted on a vehicle bottom or on a guiding elements and connected via the pivotable support with an upper frame mounted on the seat portion.

Such a frame construction is also utilized in the German Offenlegungsschrift No. 2,717,416. In this adjustment arrangement a lower structure forming a lower frame is mounted on a vehicle floor or guiding element and is connected via the pivotable supports with supporting arms forming an upper frame. The pivotable supports are height adjustable by an adjustment drive containing a braking spring coupling with a braking drum mounted on the upper frame. A helical rotary spring abutting against the braking drum provides for fixation of an adjustment shaft which supports a toothed wheel engaging with a toothed segment of a pivotable support, wherein the adjustment shaft can be actuated by a lever for releasing purposes. This height adjustment arrangement also includes a lower frame mountable on the vehicle floor or vehicle guides, and an upper frame connectable with the seat portion, wherein the upper frame and the lower frame are connected with one another by the pivotable supports. Thus, this height adjustment arrangement also has an expensive frame structure which forms a separate structural group between the vehicle floor and the seat portion.

SUMMARY OF THE INVENTION

Accordingly, it is an object of the present invention to provide a height adjustment arrangement for seats, which avoids the disadvantages of the prior art.

More particularly, it is an object of the present invention to provide a height adjustment arrangement for seats, particularly motor vehicle seats, which makes possible to dispense with an expensive frame construction.

In keeping with these objects, and with others which will become apparent hereinafter, one feature of the present invention resides, briefly stated, in a height adjustment arrangement in which two separate supporting elements are pivotally connected with each pivotable support, and one supporting element is mounted on a seat portion, whereas the other supporting element is stationarily mounted relative to a vehicle floor.

When the height adjustment arrangement is designed in accordance with the present invention, an expensive frame construction can be dispensed with, inasmuch as the lower supporting elements can be associated directly with the vehicle floor, whereas the upper supporting elements can be connected with the supporting frame of the seat portion.

In accordance with another advantageous feature of the present invention, the supporting elements are formed as angular supporting claws, and the supporting claws pivotally mounted on one end of the pivotal support are connected to the frame of the seat portion, whereas the supporting claws supporting the pivotable supports are mounted on track runways of a guide track. The static requirements are satisfied by the guide track or the vehicle floor, respectively, on the one hand, and the frame of the seat portion, on the other hand, so that additional frame parts of the height adjustment arrangement can be dispensed with. Furthermore, at least the rear upper support claws may be premounted on the frame of the seat portion for facilitating the final assembly.

For manual adjustment of the height adjustment device, it is advantageous, in accordance with a further feature of the present invention, that a thread spindle be retained axially non-displaceable on a longitudinal side of the seat by the support claws which are connected with a bearing block, and the spindle nut is connected by a coupling with an adjustment arm of a rear pivotable support, whereas the rear pivotable supports are connected with one another by a pivot shaft. In this construction the adjustment force of the adjustment mechanism arranged at one side can also be transmitted to the other side of the seat.

For obtaining a reduction of the adjustment force, the adjustment arm of the rear pivotable support, in accordance with still a further feature of the present invention, is loaded by a pressure accumulator in a manner for weight relief of the seat. The pressure accumulator is formed, advantageously, as a pressure spring surrounding the threaded spindle and abutting against an abutment of the threaded spindle, at the one end, and against the spindle nut, at the other end.

For adjusting the spring force to the weight of the user, the abutment is formed, in accordance with an additional feature of the present invention, as an adjustable nut mounted on the threaded spindle and provided with a marking, and the adjustable nut is adjustable with the aid of a scale strip mounted on the bearing block for deviation from the normal weight of the user.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
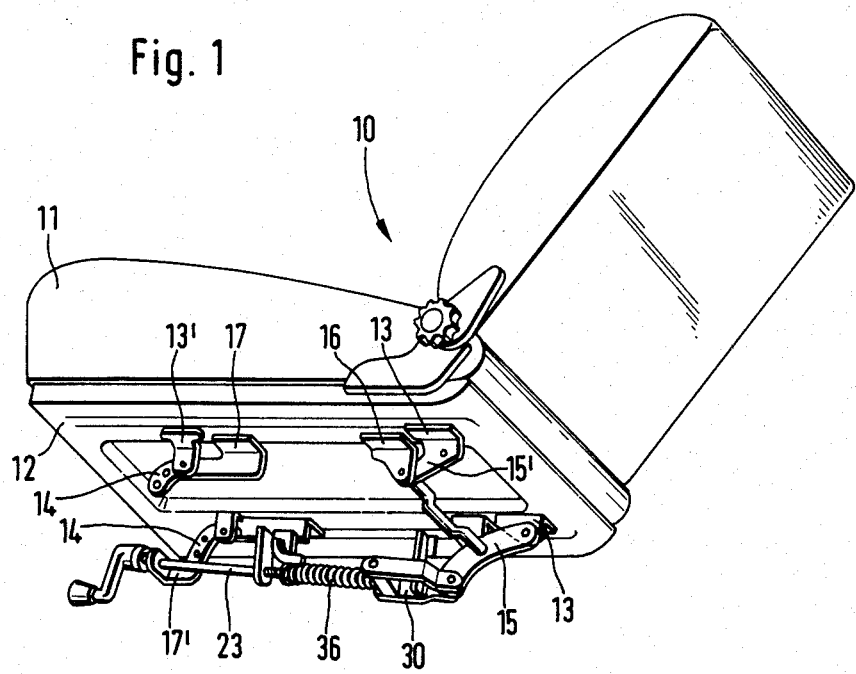
FIG. 1 is a perspective view of a seat provided with a height adjustment device in accordance with the present invention.
Figure 5:
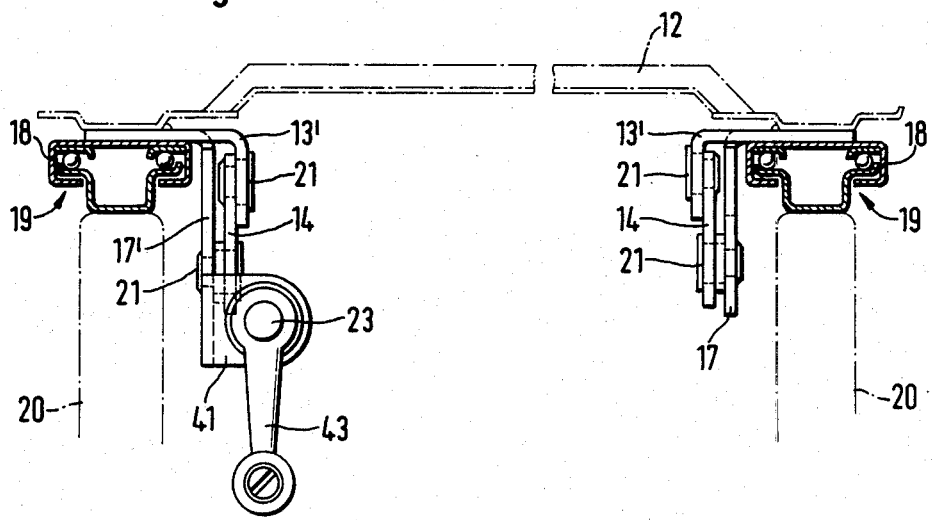
FIG. 5 is a view showing a part of the inventive height adjustment device mounted in the front area of the seat.

A seat of a motor vehicle is identified in FIG. 1 by reference numeral 10 and has a seat portion 11 whose lower side is formed as a seat frame 12 shown in dash-dotted lines in FIGS. 2-5. Supporting elements 13 and 13' formed as supporting claws are mounted on the seat frame 12 in its corner regions. They are angular and have one leg extending downwardly from the seat frame 12. Pivotal supports 14 and 15 or 15' are pivotably connected with the angular leg of the supporting elements 13 and 13'. The pivotable supports are pivotally mounted, in turn, in further supporting elements 16, 17, 17' also formed as supporting claws, and the supporting elements in the shown embodiment are fixedly connected with a track runway 18 of a guide track device 19, for example by screws. The guide track device is fixedly mounted on arms of a vehicle floor 20 shown in dash-dotted lines in FIG. 5.

The pivotable connection between the supporting elements and the pivotable supports are performed by flange bolts 21 which, for example, can be riveted in one of two parts to be pivotally connected with one another. It is also possible to use for this purpose screws 22 with a pin, as can be seen for the pivotable connection between the pivotable supports 15 or 15' and the supporting claws 13 in FIG. 4.

A threaded spindle 23 rotatably supported in bearing blocks 24 and 25 serves for height adjustment of the seat frame 12 relative to the guide track device. The bearing block 24 is mounted on the supporting claw 17' and rotatably receives the threaded spindle 23. The bearing block 25 is located in the rear seat region and mounted on the supporting claw 16 at the same longitudinal side so as to support the threaded spindle 23 rotatably, on the one hand, and axially non-displaceable, on the other hand.

Immediately in front of the bearing block 25, the threaded spindle 23 has an adjustment thread portion 26 on which a spindle nut 27 is arranged. The spindle nut 27 is mounted non-rotatably in a housing cage 28 from which bearing pins 29 extend at both sides. A fork-shaped coupling 30 surrounds the bearing block 25 at both ends and supports with one end on the bearing pins 29. The other end is pivotally connected with an adjustment arm 31 of the pivotable support 15 via a pivot pin 32. In the region between the bearing blocks 24 and 25, the threaded spindle 23 is provided adjacent to the bearing block 24 with a thread 33, and an adjustment nut 34 with a pressure disk 35 is screwed on the thread 33.

A pressure spring 36 is arranged between the pressure disk 35 and the housing cage 28 of the spindle nut 27. The pressure spring 36 loads the pivotable support 15 via the spindle nut 27 and the coupling 30 in counterclockwise direction.

The adjustment nut 34 serving as an abutment has an annular marking 37 which, together with a scale strip 38 mounted on the front bearing block 24, adjusts the tension in the pressure spring 36.

Both oppositely arranged pivotable supports 15 and 15' mounted in the supporting claws 16 are fixedly connected with one another via a pivot shaft 39. The pivot shaft 39 is formed as a pipe connected with the bearing pins 40 of the pivotable supports 15 and 15'. The front end of the threaded spindle 23 is again mounted in an angular extension tension 41 of the supporting claw 17' and extends beyond the same with a pin 42. A manual handle 43 is mounted on the pin 42 for joint rotation therewith so as to perform a manual adjustment to rotate the spindle 23.

Figure 2:
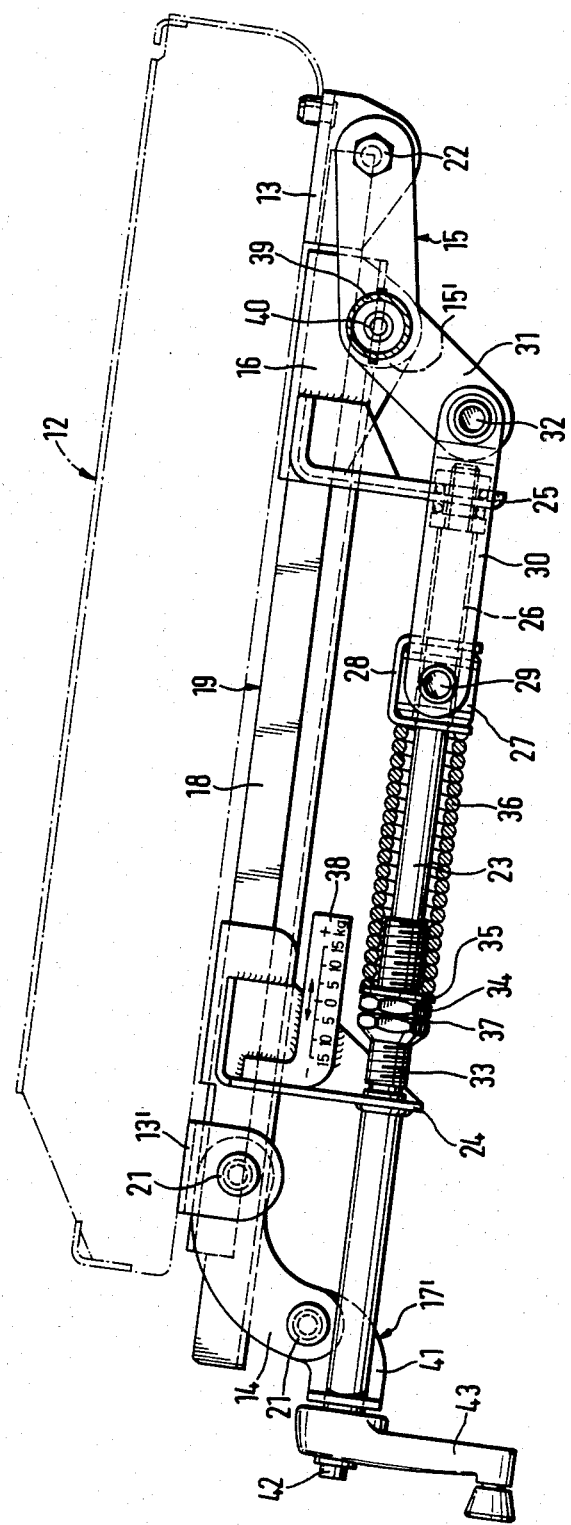
FIG. 2 is a view showing a longitudinal section of the inventive height adjustment device in a lowered position and on an enlarged scale as compared with FIG. 1.
Figure 3:
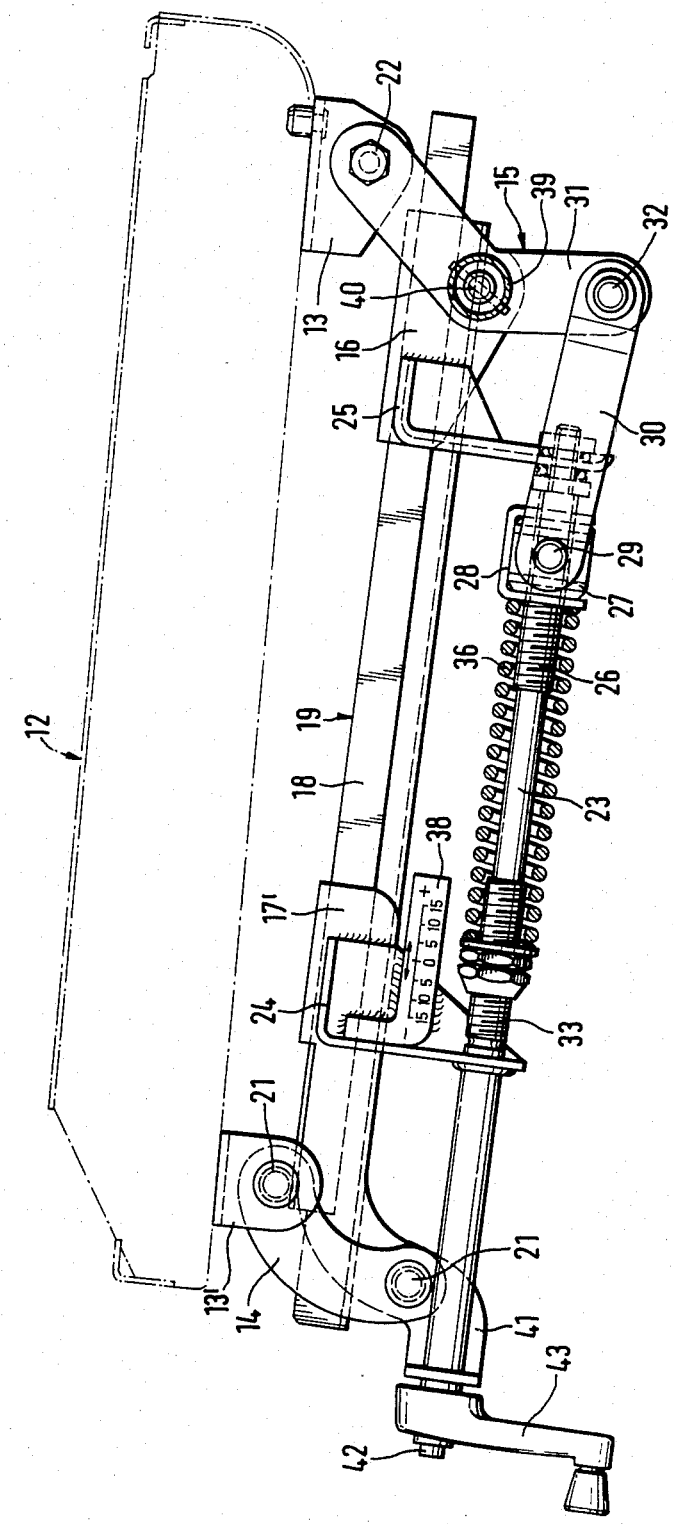
FIG. 3 is a view showing the height adjustment device of FIG. 2, but in a raised position.
Figure 4:
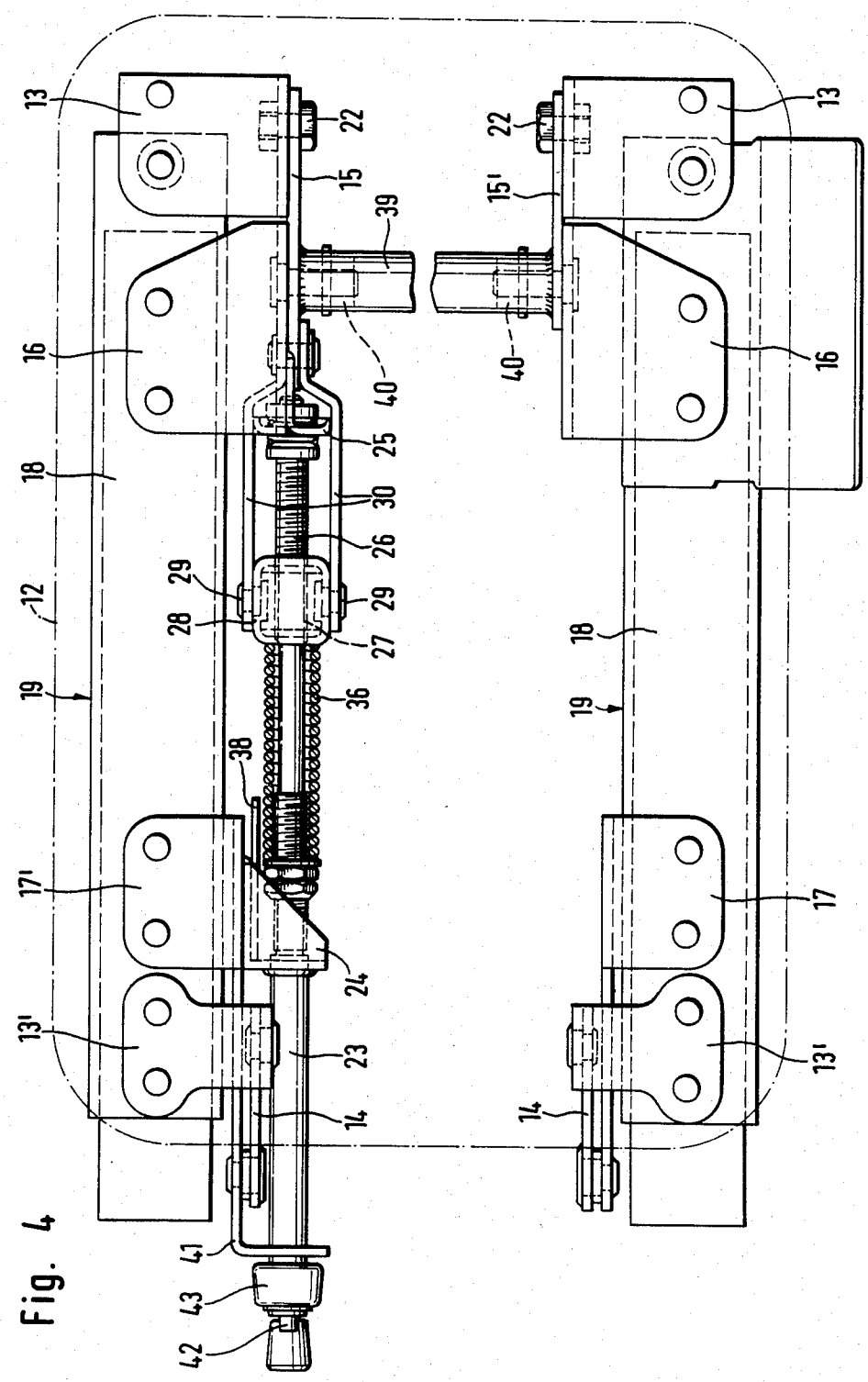
FIG. 4 is a plan view of the inventive height adjustment device with the seat portion removed.

In dependence upon the direction of rotation of the threaded spindle 23, the spindle nut 24 with the bearing pins 29 of its housing cage 28 moves forwardly and rearwardly. When the manual handle 43 is rotated so that the spindle nut 27 moves rearwardly to the bearing block 25, the pivotable support 15 is turned via the coupling 30 in counterclockwise direction in the bearing pin 40 so that the pin screw 22 travels upwardly and the supporting claw 13 with the seat frame 12 mounted thereon is pushed upwardly. The pivotable support 15 at the opposite side of the seat also moves in the same way through the pivot shaft 39. The supporting claws 13 and 13' are fixedly connected with one another by the seat frame 12 so that during lifting of the rear region of the seat frame 12, the front region of the seat frame is also lifted around the flange bolts 21 via the pivotable support 14. The seat frame 12 with the seat 10 mounted thereon is thereby lifted from the position shown in FIG. 2 to the position shown in FIG. 3. The pressure spring 36 compensates for the weight of the seat user and, if needed, also the seat weight, so that the tension force of the pressure spring 36 can be reduced or increased. The adjustment of the scale strip can be so selected that the weight of the seat user or the differential weight of the seat user between the normal weight of approximately 35 kg and the actual weight of the user can be directly readable. As can be seen in FIGS. 2 and 3, the differential weight is applied in the positive as well as in the negative manner from a zero position. For lowering the seat, the manual handle 43 is rotated in the opposite direction so that the spindle nut 27 travels to the left against the action of the pressure spring 36 and the pivotable supports 15, 15' and thereby the pivotable support 14 turn in clockwise direction, so that the seat is lowered.

The above described embodiment is only an example of the invention and the invention is not limited to this description. Many changes and other embodiments of the invention are possible. Thus, for example, it is feasible to replace the manual handle 43 by a manual wheel, or to provide a motor drive for the threaded spindle 23 for actuating the latter via, for example, a gear train.

It will be understood that each of the elements described above, or two or more together, may also find a useful application in other types of constructions differing from the types described above.

While the invention has been illustrated and described as embodied in a height adjustment arrangement for a seat, particularly a motor vehicle seat with a raisable and lowerable seat portion, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A height adjustment arrangement for a seat, particularly a motor vehicle seat with a seat portion raisable and lowerably relative to a vehicle floor and having a frame and a longitudinal side, the arrangement comprising a guide track device fixable on the vehicle floor and having a track runway;

a plurality of pivotable supports, each having one end portion arranged at a fixed height relative to a vehicle floor and another end portion hingedly connectable with a seat portion, each of said supports having an upper end and a lower end;

means for moving said pivotable supports and including a rotatable threaded spindle and a non-rotatable nut engaging with said spindle;

a plurality of pairs of separate supporting elements including a first supporting element pivotally connected with said upper end of each of said supports and mounted on said seat portion and a second supporting element pivotally connected with said lower end of each of said supports and arranged at a fixed height relative to the vehicle floor, said second supporting elements being mounted on said track runway of said guide track device, said first and second seat supporting elements being formed as first and second angular supporting claws, respectively, said first supporting claws being pivotally mounted on one end of the respective pivotable supports and connectable with the frame of the seat portion, said second supporting claws supporting said pivotable supports and being mountable on the track runways of the guide track; and a bearing block connected with said second supporting claws, said threaded spindle being axially immovably retained on the longitudinal side of the seat in said bearing block.

2. A height adjustment arrangement as defined in claim 1, wherein said pivotable supports include rear pivotable supports of which one rear pivotable support has an adjustment arm; and further comprising a coupling connecting said thread nut with said adjustment arm, and a pivot shaft connecting said rear pivotable supports with one another.

3. A height adjustment arrangement as defined in claim 2; and further comprising a force accumulating means arranged to act upon said adjusting arm of said one rear support in a manner of weight relief of the seat.

4. A height adjustment arrangement as defined in claim 3, wherein said force accumulating means is formed as a spring surrounding said threaded spindle, said threaded spindle having an abutment, and said spring abutting at its one end against said abutment and at its other end against said spindle nut.

5. A height adjustment arrangement as defined in claim 4; and further comprising means for adjusting said spring of said force acuumulating means in correspondence with deviations of a user's weight.

6. A height adjustment arrangement as defined in claim 5, wherein said abutment is an adjustable nut provided with a marking, said spring adjusting means including said adjustable nut with said marking and a scale strip mounted on said bearing block to adjust said adjustable nut.

* * * * *